(12) United States Patent
Heath

(10) Patent No.: US 10,801,567 B2
(45) Date of Patent: Oct. 13, 2020

(54) LINE BRAKES

(71) Applicant: Rock Exotica LLC, Clearfield, UT (US)

(72) Inventor: James Heath, Seattle, WA (US)

(73) Assignee: Rock Exotica, LLC, Clearfield, UT (US)

( * ) Notice: Subject to any disclaimer, the term of this patent is extended or adjusted under 35 U.S.C. 154(b) by 122 days.

(21) Appl. No.: 16/044,187

(22) Filed: Jul. 24, 2018

(65) Prior Publication Data

US 2018/0328424 A1 Nov. 15, 2018

Related U.S. Application Data

(62) Division of application No. 14/631,094, filed on Feb. 25, 2015, now Pat. No. 10,054,176.

(51) Int. Cl.
   *F16D 63/00* (2006.01)
   *A63J 1/02* (2006.01)
   *F16D 125/28* (2012.01)

(52) U.S. Cl.
   CPC .............. *F16D 63/008* (2013.01); *A63J 1/02* (2013.01); *F16D 2125/28* (2013.01)

(58) Field of Classification Search
   CPC ...... F16D 63/008; F16D 2125/28; A63J 1/02; B66D 5/16
   See application file for complete search history.

(56) References Cited

U.S. PATENT DOCUMENTS

| 1,026,118 A | | 5/1912 | Pearson | |
|---|---|---|---|---|
| 1,412,921 A | | 4/1922 | Chapman | |
| 1,425,569 A | | 8/1922 | Arnold | |
| 1,838,139 A | | 12/1931 | Fitch | |
| 1,956,903 A | * | 5/1934 | Kline | F16G 11/106 |
| | | | | 114/199 |
| 2,341,772 A | | 2/1944 | Handy | |
| 2,511,697 A | * | 6/1950 | Clift | B66B 5/044 |
| | | | | 187/375 |
| 2,670,925 A | | 3/1954 | Des Champs | |
| 2,704,651 A | | 3/1955 | Cummings | |

(Continued)

FOREIGN PATENT DOCUMENTS

| EP | 1181963 A1 | 2/2002 |
|---|---|---|
| JP | 3051214 U | 8/1998 |
| WO | 2014/075954 A1 | 5/2014 |

*Primary Examiner* — Michael E Gallion
(74) *Attorney, Agent, or Firm* — TraskBritt

(57) ABSTRACT

A lift system includes an overhead support, a counterweight, a base unit including a brake and secured to a floor, a fly line, and a load line. The fly line connects the counterweight, the overhead support, and the base unit via pulleys. The brake is configured to engage the fly line to limit movement of the counterweight and a load. A manual rope brake includes a housing having a base portion, an upper portion, and a hinge rotatably connecting the upper portion to the base portion. A cam lock is within the housing between pulleys. The cam lock engages a rope when the brake is engaged, and disengages from the rope when the brake is disengaged. A portable lift system includes a container configured to carry pulleys, a base unit, a fly line, and a load line when the lift system is in transport. Related methods are also disclosed.

6 Claims, 13 Drawing Sheets

(56) References Cited

U.S. PATENT DOCUMENTS

| | | | | |
|---|---|---|---|---|
| 2,991,526 A | * | 7/1961 | Kuebler | A63J 1/028 24/115 R |
| 3,186,372 A | * | 6/1965 | Cleveland | B63B 21/08 114/199 |
| 3,507,361 A | | 4/1970 | Savage | |
| 4,097,023 A | * | 6/1978 | Muller | B63B 21/08 188/65.1 |
| 5,106,057 A | * | 4/1992 | Feller | B66D 1/26 254/283 |
| 5,154,132 A | * | 10/1992 | Brushaber | E02B 3/24 114/230.11 |
| 5,205,219 A | | 4/1993 | Groskreutz et al. | |
| 5,492,236 A | | 2/1996 | Foy | |
| 5,838,246 A | | 11/1998 | Voorhees | |
| 6,216,826 B1 | * | 4/2001 | Botzet | B60T 1/067 187/375 |
| 6,695,291 B2 | * | 2/2004 | Kleimeyer | A63G 31/00 254/266 |
| 6,729,605 B2 | | 5/2004 | Brackman et al. | |
| 7,461,831 B2 | | 12/2008 | Mosley | |
| 7,543,799 B2 | * | 6/2009 | Willis | B63B 21/04 254/336 |
| 8,636,265 B1 | | 1/2014 | Soot | |
| 8,684,854 B2 | | 4/2014 | Fisher | |
| 8,733,504 B2 | * | 5/2014 | Mauthner | A62B 1/14 182/191 |
| 8,733,739 B2 | * | 5/2014 | Mauthner | A62B 1/14 254/391 |
| 8,820,487 B2 | * | 9/2014 | Bowman | A62B 1/14 182/5 |
| 9,173,386 B2 | * | 11/2015 | Karpanty | A01K 91/08 |
| 9,260,279 B2 | | 2/2016 | Hoffend, III | |
| 9,757,598 B2 | * | 9/2017 | Codega | A62B 1/14 |
| 10,054,176 B2 | * | 8/2018 | Heath | A63J 1/02 |
| 2003/0089551 A1 | | 5/2003 | Kato et al. | |
| 2006/0163548 A1 | | 7/2006 | Kochan et al. | |
| 2006/0207829 A1 | * | 9/2006 | Mauthner | A62B 1/14 182/5 |
| 2007/0227830 A1 | * | 10/2007 | Svitavsky | A63J 1/028 187/366 |
| 2008/0223665 A1 | | 9/2008 | O'Donnell | |
| 2011/0100759 A1 | | 5/2011 | Yu et al. | |
| 2012/0137924 A1 | | 6/2012 | Boren et al. | |
| 2012/0138391 A1 | | 6/2012 | Weinberger | |
| 2013/0001020 A1 | | 1/2013 | Kigawa et al. | |
| 2014/0054115 A1 | | 2/2014 | Becker | |
| 2014/0182976 A1 | | 7/2014 | Valjus et al. | |
| 2015/0021010 A1 | | 1/2015 | Chaika | |
| 2016/0115003 A1 | | 4/2016 | Biondich et al. | |
| 2016/0243458 A1 | * | 8/2016 | Heath | A63J 1/02 |
| 2017/0088150 A1 | | 3/2017 | Christinet | |
| 2017/0157433 A1 | * | 6/2017 | Cylvick | A62B 1/20 |
| 2018/0029854 A1 | | 2/2018 | Hoffend | |
| 2018/0231075 A1 | * | 8/2018 | Mahana | F16D 63/008 |

\* cited by examiner

LINE BRAKES

CROSS-REFERENCE TO RELATED APPLICATION

This application is a divisional of U.S. patent application Ser. No. 14/631,094, filed Feb. 25, 2015, now U.S. Pat. No. 10,054,176, issued Aug. 21, 2018, the disclosure of which is hereby incorporated herein in its entirety by this reference.

FIELD

Embodiments of the present disclosure relate generally to lifting systems and methods, such as portable lifting systems that may be temporarily installed in, for example, a theater.

BACKGROUND

Rigging or lifting systems are used in theaters to raise and lower objects on and off stage. For example, scenery backdrops may be raised and lowered by a system of ropes, cables, pulleys, tracks, weights, motors, etc. For example, a rope or cable may be secured to a motorized winch assembly, around one or more pulleys attached to a frame above and/or around the stage, and connected to an object to be lifted (e.g., scenery, curtains, props, an actor, etc.). Some systems may be manually operated, in which ropes are raised and lowered by stage hands, and tied off when not being used to raise or lower loads.

Particular attention should be paid to safety of theatrical lifting systems because a falling load can lead to injuries or loss of life. Safety while lifting humans (e.g., actors) is especially important. During performances, it is sometimes desirable to raise and lower actors, such as to create the illusion of flying. Lifting systems for such applications should be easy to operate and be fast enough to create the desired visual effect when moving the actor.

Some productions are performed at various theaters around the country or the world. Crew typically pack and ship nearly everything needed for a particular show, relying on each location to have only the most basic facilities, such as a stage, overhead supports, lights, curtains, etc. Producers of traveling productions therefore may tend to choose props, costumes, etc., that are lightweight and that can be packed into relatively smaller space than productions that are not expected to travel. Producers may also choose to modify scripts to avoid the need to carry some equipment or to avoid the need for facilities or equipment that will not be available. For example, if adequate facilities for lifting actors are not expected to be available, a producer may modify or remove a flying scene to avoid the need lift an actor.

BRIEF SUMMARY

In some embodiments, a lift system includes an overhead support having at least a first pulley and a second pulley, a counterweight having at least an upper pulley and a lower pulley, a base unit secured to a floor, a fly line connected to the overhead support and the base unit, and a load line. The base unit includes a brake and at least one pulley. The fly line passes around the upper pulley of the counterweight, around the at least a first pulley of the overhead support, around the at least one pulley of the base unit, and around the lower pulley of the counterweight. The load line is connected to the counterweight passing around the second pulley of the overhead support and connected to a load, such that a change in elevation of the counterweight corresponds to a change in position of the load. The brake is configured to engage the fly line to limit movement of the counterweight.

A manual line brake includes a housing having a base portion, an upper portion, and a hinge rotatably connecting the upper portion to the base portion. A first pulley is rotatably secured to the base portion of the housing. A second pulley is rotatably secured to the upper portion of the housing. A cam lock is within the housing between the first pulley and the second pulley. The cam lock is configured to engage a rope passing from the first pulley to the second pulley when the upper portion of the housing is in a first position, and the cam lock is configured to disengage from the rope when the upper portion of the housing is in a second position.

A method of vertically moving a load includes routing a fly line adjacent at least one pulley secured to a counterweight, adjacent at least one pulley secured to an overhead support, through a base unit comprising at least one pulley and a manual brake, and adjacent at least another pulley secured to the counterweight. The method also includes routing a load line adjacent at least one pulley, securing the base unit to a floor below the overhead support, applying a force to the base unit to disengage the manual brake, and pulling the fly line to move the counterweight vertically in a first direction and to move a load vertically in a second direction substantially opposite the first direction. Ends of the fly line are secured to the overhead support and to the base unit, and ends of the load line are secured to the counterweight and to the load.

A portable lift system includes a plurality of pulleys, a base unit configured to be secured to a floor, a fly line, a load line, and a container configured to carry the plurality of pulleys, the base unit, the fly line, and the load line when the lift system is in transport. The base unit includes at least one pulley and a brake. The container includes a frame defining a plurality of mounting holes configured to be secured to at least two pulleys of the plurality when the portable lift system is in use. The container is configured to vertically carry a counterweight when the portable lift system is in use. The brake is configured to engage the fly line to limit movement of the counterweight.

In some embodiments, a method of operating a lift system includes disengaging a manual brake, pulling the first fly line to move a counterweight vertically in a first direction and move a first load vertically in a second direction, and engaging the manual brake to limit movement of the first fly line. The manual brake is configured to limit movement of a first fly line when the manual brake is engaged when the manual brake and the first fly line are located at a first location. The second direction is substantially opposite the first direction, and the counterweight comprises a container. The method may further include disposing the manual brake within the container, transporting the container with the manual brake therein to a second location, configuring the manual brake to limit movement of a second fly line at the second location when the manual brake is engaged, disengaging the manual brake, pulling the second fly line to move the counterweight vertically in a third direction and move a second load vertically in a fourth direction, and engaging the manual brake to limit movement of the second fly line. The fourth direction is substantially opposite the third direction.

A line stopper includes a rigid member defining a tapered cavity therethrough and a line passing through the tapered cavity. The tapered cavity has a first cross-sectional area at one end thereof and a second cross-sectional area at an opposite end thereof. The first cross-sectional area is larger than the second cross-sectional area. The line has a tapered plug disposed within the line. The tapered plug has a shape corresponding approximately to the shape of the tapered cavity in the rigid member. The line surrounding the tapered plug has a cross-sectional area larger than the second cross-sectional area of the rigid member.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments when read in conjunction with the accompanying drawings, in which:

DETAILED DESCRIPTION

The illustrations presented herein are not actual views of any particular lift system, but are merely idealized representations that are employed to describe example embodiments of the present disclosure. Additionally, elements common between figures may retain the same numerical designation.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific orientation or order, except where the context clearly indicates otherwise.

As used herein, the term "substantially," in reference to a given parameter, property, or condition, means to a degree that one of ordinary skill in the art would understand that the given parameter, property, or condition is met with a small degree of variance, such as within acceptable manufacturing tolerances.

As used herein, the term "location" in reference to a lift system or components thereof means a place where a lift system is used or installed, encompassing the volume within the operating limits of the lift system as installed. Though some parts of the lift system move during use of the lift system, the system itself is considered to be at a location bounded by the outer extent of positions in which components of the lift system may be without disconnecting such components of the lift system.

A lift system according to the present disclosure may include an overhead support, a counterweight, a base unit, a fly line, and a load line. The overhead support, the counterweight, and the base unit each include pulleys to guide the lines in the system. The base unit may also include a brake to stop the lines from moving. The fly line is connected at either end to the overhead support and the base unit, and the fly line passes around an upper pulley of the counterweight, around at least one pulley of the overhead support, around at least one pulley of the base unit, and around a lower pulley of the counterweight. The load line is connected to the counterweight and a load, passing around a pulley of the overhead support. In operation, a change in elevation of the counterweight corresponds to a change in position (typically elevation) of the load. The counterweight may be selected to have approximately the same mass as the load, such that an operator need not expend excessive effort to raise or lower the load.

Figure 1A:
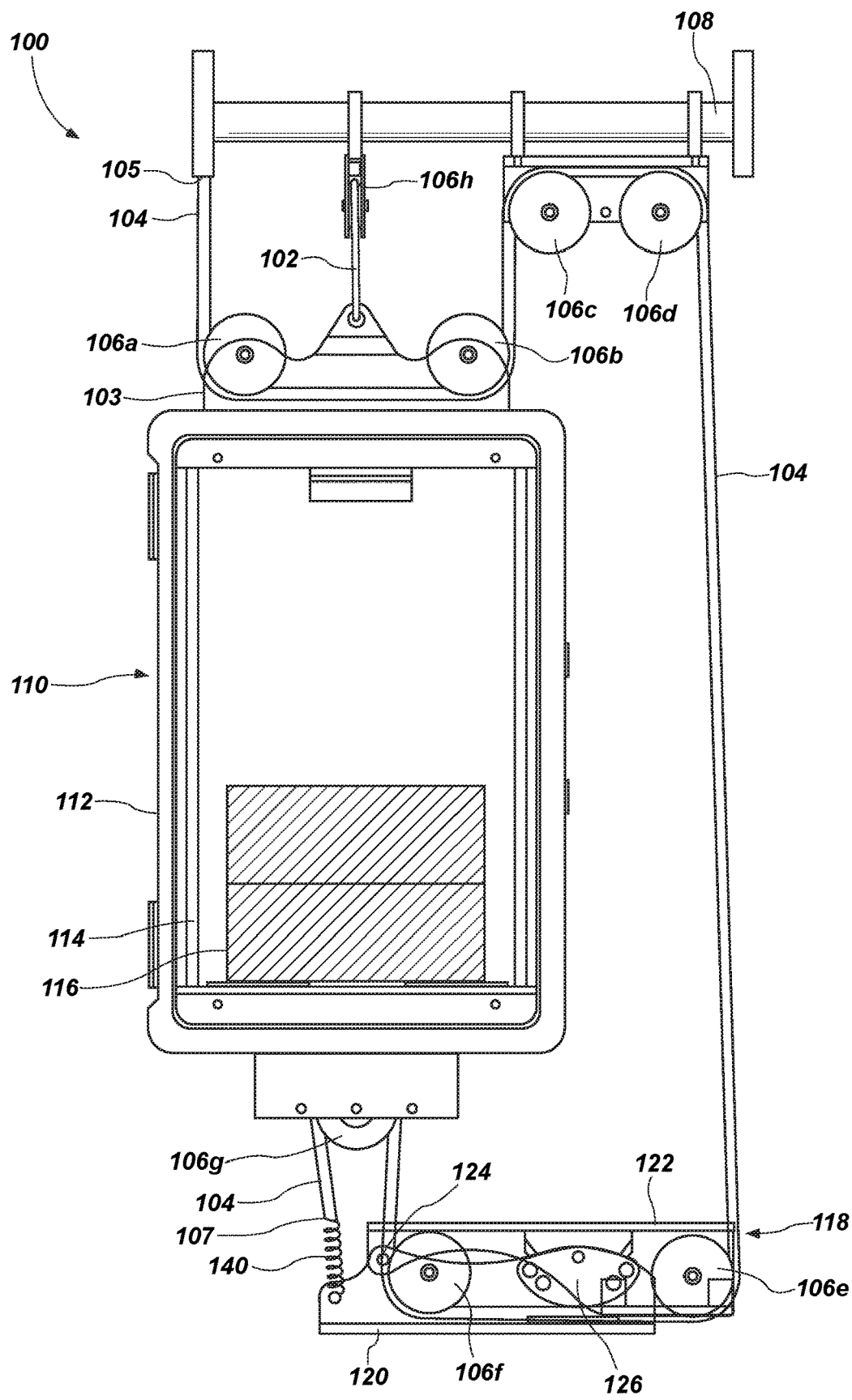
FIGS. 1A and 1B are simplified cross-sectional side views illustrating an embodiment of a lift system according to the present disclosure.

FIG. 1A illustrates a simplified view of a lift system 100. The system includes a load line 102 that may be configured to raise and lower a load 111 (see FIG. 1B). A fly line 104 (which may be referred to in the art as a "purchase line," "operating line," or "hand line") routed around pulleys 106a, 106b, etc. (collectively referred to as pulleys 106), and secured to an overhead support 108, is configured to move a counterweight 110 vertically and therefore move the load 111 attached to the load line 102. As shown in FIG. 1A, one end 105 of the fly line 104 is secured to the overhead support 108, and an opposite end 107 of the fly line 104 is secured to a base unit 118. The fly line 104 is routed around pulleys 106a, 106b (which may be secured to a bracket 103 or to a part of the counterweight 110), pulleys 106c, 106d (which may be secured to or part of the overhead support 108), pulleys 106e, 106f (which may be secured to or part of the base unit 118), and pulley 106g (which may be secured to or a part of the counterweight 110). An operator may pull the fly line 104 one direction or the other (up or down from the perspective of FIG. 1A) to move the counterweight 110 upward or downward.

Figure 1B:
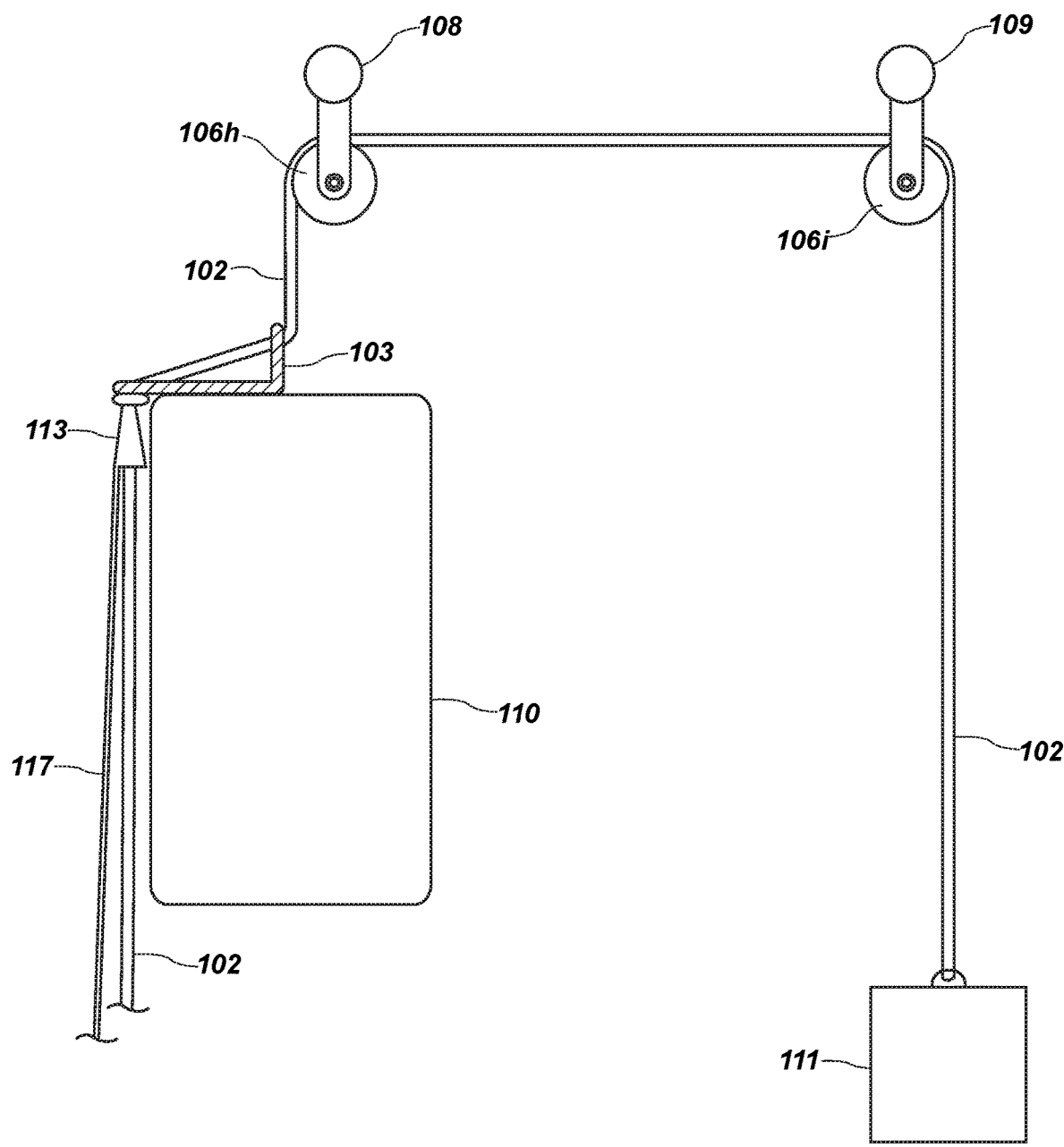

A portion of the lift system 100 is shown in FIG. 1B. In particular, FIG. 1B illustrates the load line 102, which connects the counterweight 110 to the load 111. The fly line 104 and its associated pulleys 106 are omitted from FIG. 1B for clarity. The load line 102, passing over pulley 106h (and optionally one or more additional pulleys 106i, such as may be secured to another overhead support 109) moves the load 111 in response to movement of the counterweight 110. The lift system 100 may further include a line stopper 113 configured to limit the distance the load line 102 can travel. The line stopper 113 may control the length of load line 102 between the counterweight 110 and the load 111. The line stopper 113 may be used to attach and detach the load 111 to and from the load line 102, and may be used to adjust the position of the load 111 with respect to the counterweight 110. In some embodiments, the line stopper 113 may be movable along the length of the load line 102.

Figure 6:
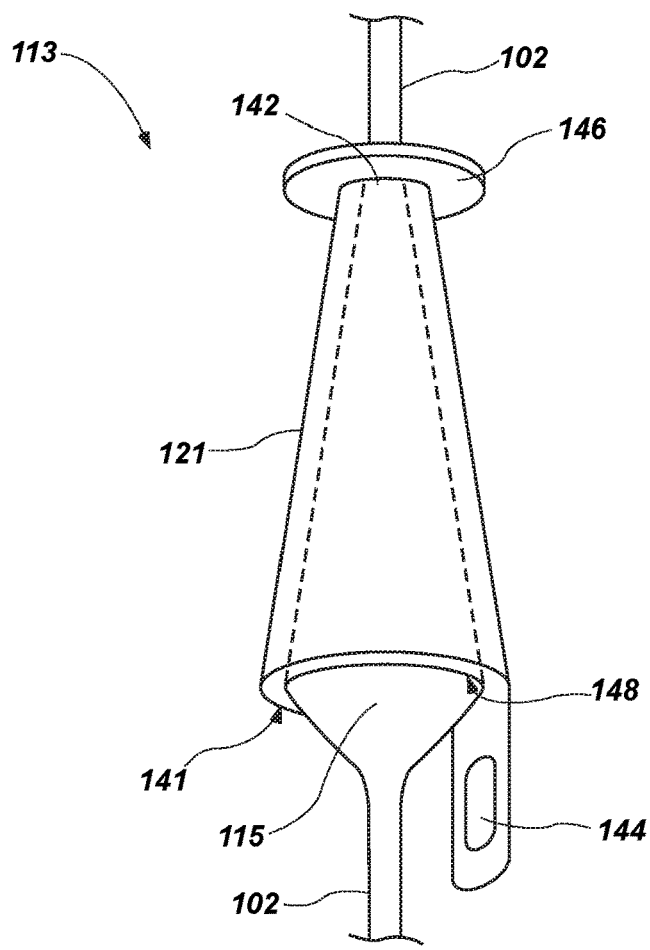
FIG. 6 is a simplified perspective view of a line stopper in accordance with an embodiment of the present disclosure.
Figure 7:
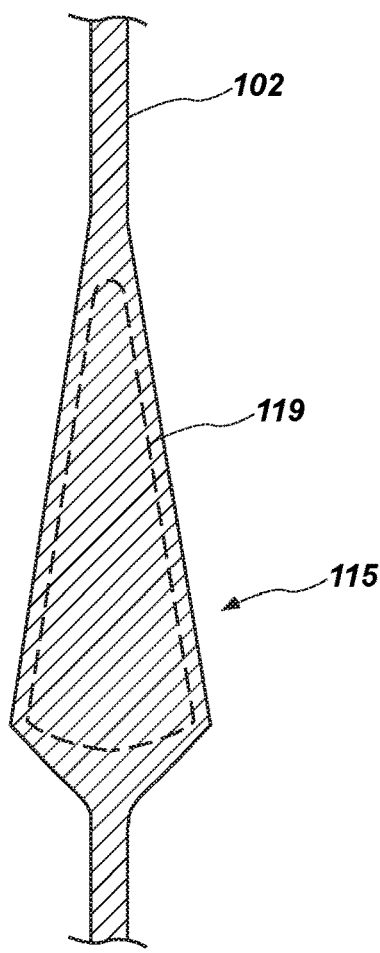
FIG. 7 is a simplified cross-sectional view of a load line that may be used with the line stopper shown in FIG. 6.
Figure 8:
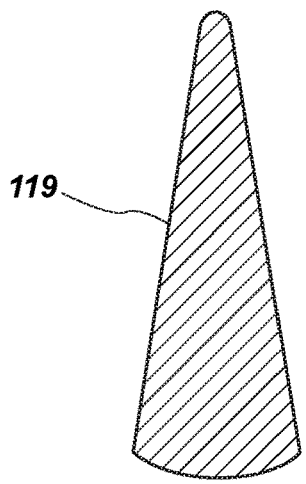
FIG. 8 is a simplified cross-sectional view of a tapered plug that may be used with the line stopper shown in FIG. 6.

The line stopper 113 is shown in more detail in FIG. 6. The line stopper 113 may include a rigid member 121 defining a tapered cavity 148 through which the load line 102 passes. The tapered cavity 148 need not have a straight taper. For example, the wall of the tapered cavity 148 may have a conical shape, a parabolic shape, a spline, a flare, a shape corresponding to a portion of an elliptical trace, or some other shape having a varying cross-section. The tapered cavity 148 extends from a large opening 141 to a small opening 142. The load line 102 may have a portion 115 having a thickness greater than a thickness of the remainder of the load line 102, and may have an exterior shape corresponding approximately to the shape of the tapered cavity 148. The maximum thickness of the portion 115 of the load line 102 may be greater than a width of the small opening 142 of the line stopper 113. The portion 115 of the load line 102 may include strands of rope woven around a solid object. For example, FIG. 7 illustrates part of the load line 102 in which the portion 115 is woven around a tapered plug 119. The tapered plug 119 is shown alone in FIG. 8. After the portion 115 passes through the large opening 141, the portion 115 (including the tapered plug 119) may become wedged in the tapered cavity 148 of the rigid member 121, preventing further movements of the load line 102 in one direction. The shape of the tapered plug 119 may help distribute pressure from the line stopper 113 to the load line 102, and may prevent premature failure of the load line 102.

The tapered plug 119 may be movable within the load line 102, such as by releasing tension on the load line and sliding the tapered plug 119 inside the load line 102. In conventional systems, metallic slugs may be crimped onto wire ropes. However, some types of ropes (e.g., high modulus polyethylene (HMPE), aramid, liquid crystal polymer, etc.) can be damaged by crimping and removing metallic slugs. Because the tapered plug 119 disclosed herein need not crimp the load line 102, the tapered plug 119 may be used with such ropes.

Figure 9:
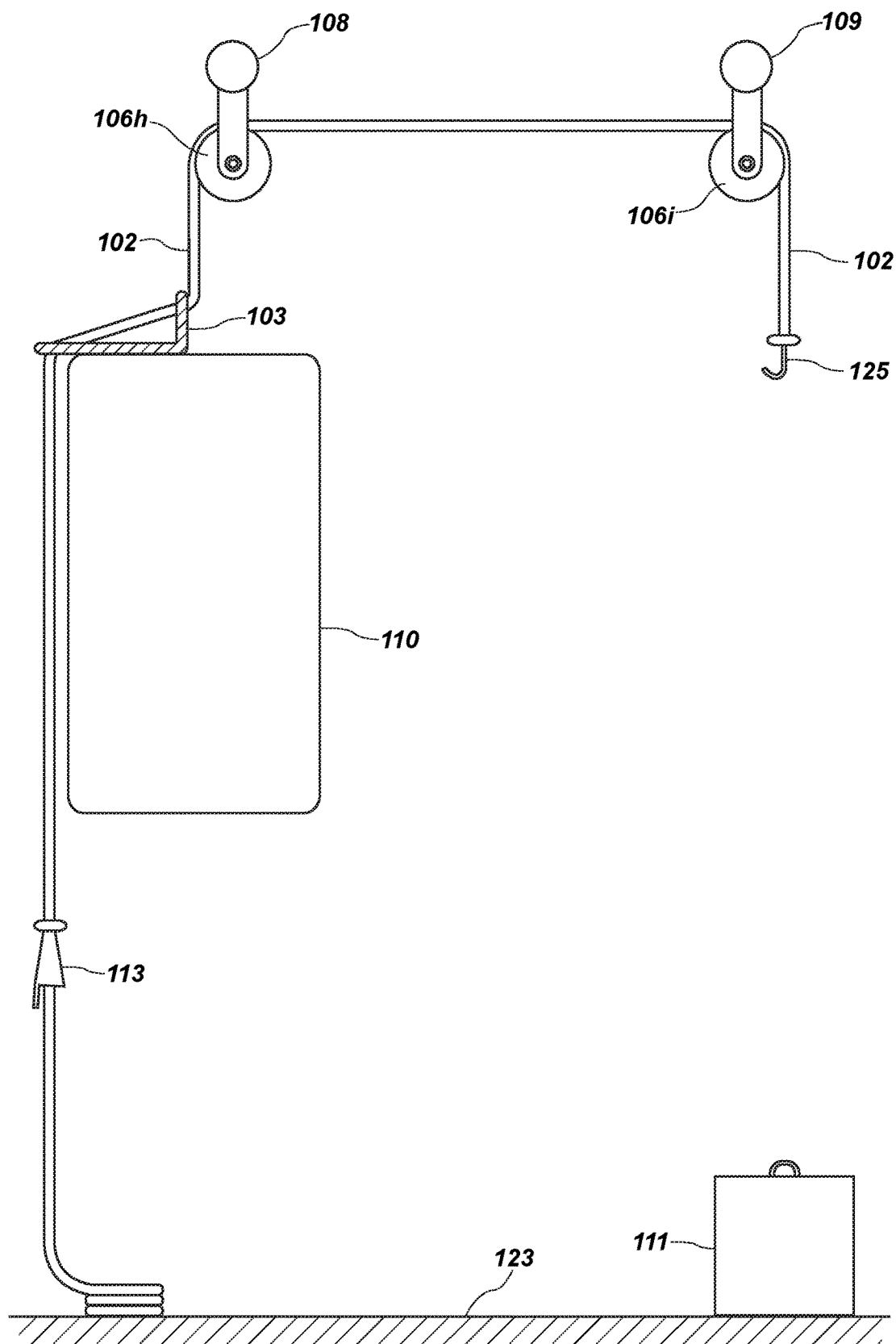
FIGS. 9 through 11 are simplified cross-sectional side views illustrating use of the line stopper shown in FIG. 6.
Figure 10:
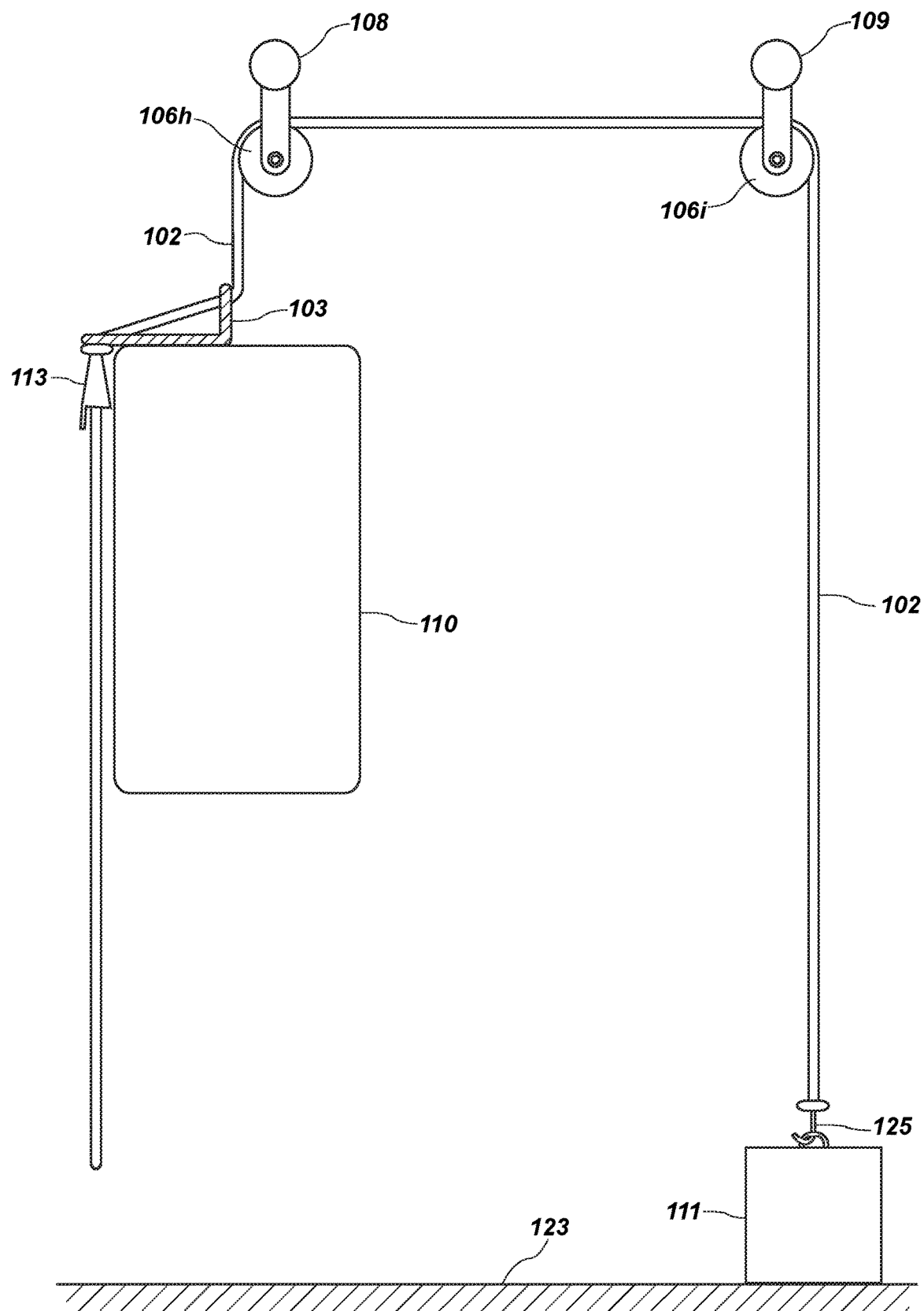
Figure 11:
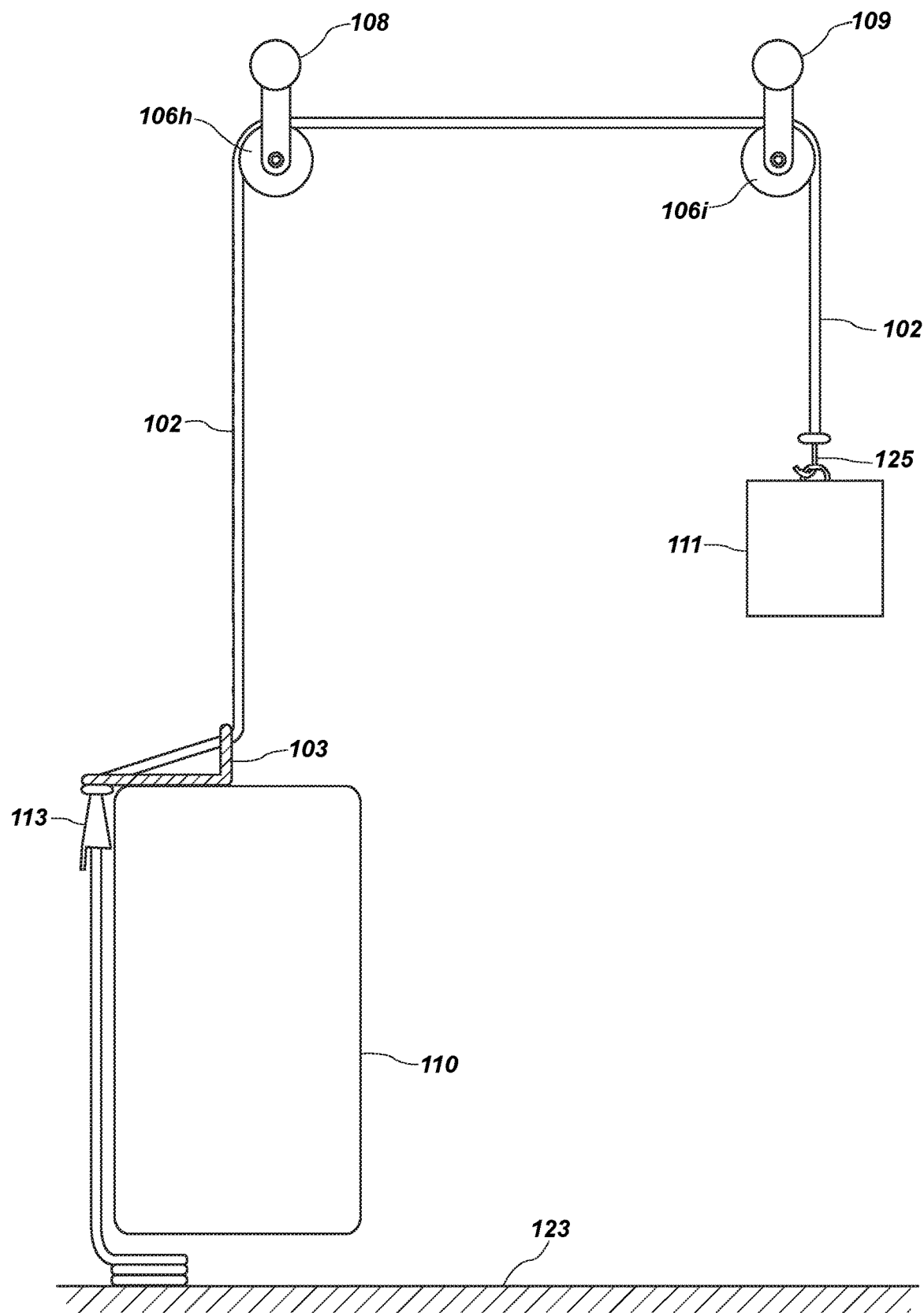

The line stopper 113 may be used as a termination or attachment of the load line 102 to the counterweight 110, as shown in FIGS. 9 through 11. As shown in FIG. 9, the load 111 may initially rest on a floor 123, and the line stopper 113 may be secured to a portion of the load line 102 away from the counterweight 110. The counterweight 110 may be held in place by the fly line 104 and its associated pulleys 106 (not shown in FIGS. 9 through 11; see FIG. 1A). The load line 102 may include a hook 125 or other means for securing the load 111 to be lifted. The hook 125 may be allowed to lower, which raises the line stopper 113, such as until the line stopper 113 contacts the bracket 103. The hook 125 may then be secured to the load 111, as shown in FIG. 10. With the line stopper 113 in contact with the bracket 103, movement of the counterweight 110 may cause an equal and opposite movement of the load 111. For example, FIG. 11 illustrates that the counterweight 110 has moved downward while the load 111 has been raised above the floor 123.

The line stopper 113 may be used a variety of systems in which a movable termination or midline attachment is desirable. That is, the line stopper 113 may be beneficial even for applications in which there is no counterweight.

Referring again to FIG. 6, the line stopper 113 may include an attachment point 144 for securing a safety line 117 (see FIG. 1B), which may be secured to a wall, the floor 123, the base unit 118 (see FIG. 1A), etc. The line stopper 113 may also include a flange 146. The flange 146 may be used to assist in installing the line stopper 113 in compression. The flange 146 may also be used to help separate the line stopper 113 from the portion 115 of the load line 102 after the portion 115 has become wedged in the tapered cavity 148 (e.g., by tapping the flange 146 with a mallet). The flange 146 may also act as a contact point for pressing against the bracket 103 when the line stopper 113 is a termination (see FIGS. 10 and 11).

The line stopper 113 may include a metal, an alloy, a polymer, a composite, or any other selected material. For example, the line stopper 113 may be formed of an aluminum alloy (e.g., aluminum alloy 7075) or of steel.

Figure 12:
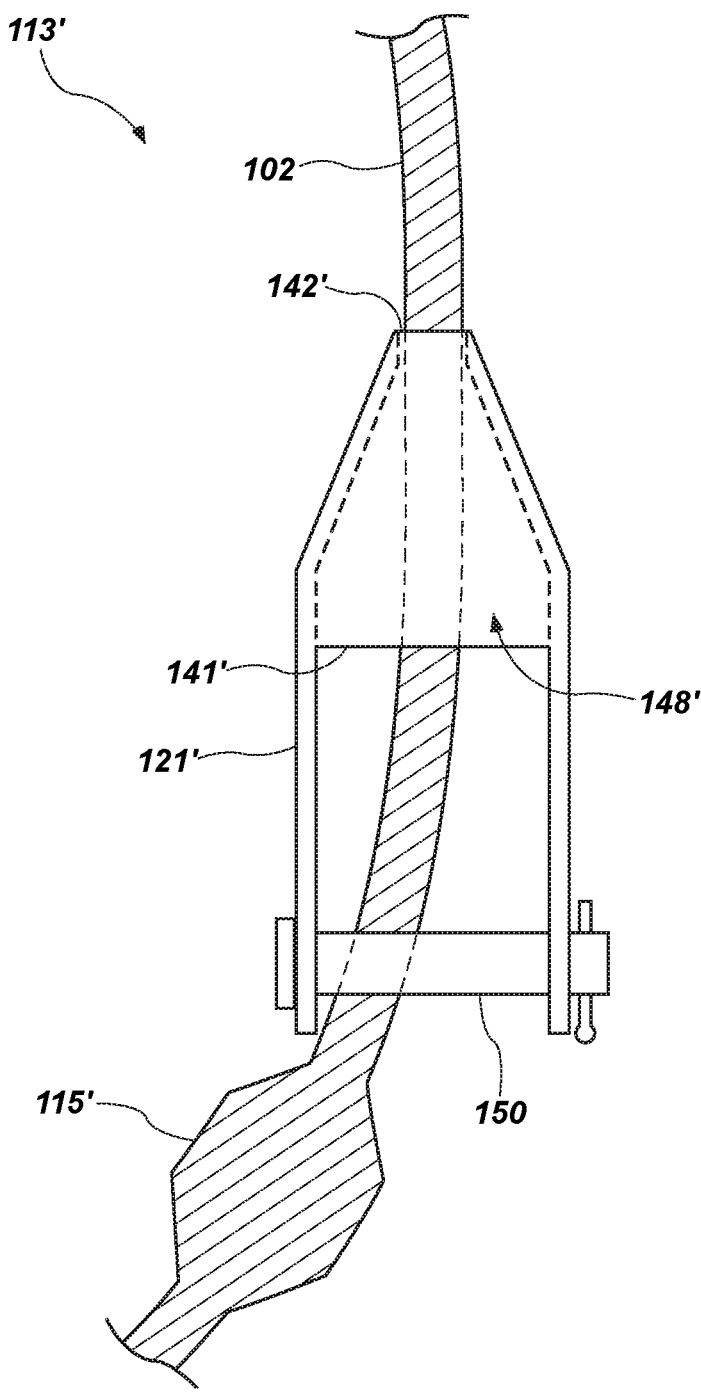
FIG. 12 is a simplified side view of another embodiment of a line stopper.

FIG. 12 illustrates another embodiment of a line stopper 113' that may be used with the system 100. The line stopper 113' may include a rigid member 121' defining a tapered cavity 148' through which the load line 102 passes. The tapered cavity 148' extends from a large opening 141' to a small opening 142'. A pin 150 may pass through sides of the line stopper 113' for attachment to rigging equipment (e.g., ropes, cables, hooks, etc.). The load line 102 may include a portion 115' having a thickness greater than a thickness of the remainder of the load line 102, such that the portion 115' may become wedged into the tapered cavity 148'. The line stopper 113' may function in substantially the same way as the line stopper 113 shown in FIG. 6 and described above.

The overhead supports 108, 109 may be built into or otherwise be a part of a theater structure. For example, stages are typically equipped with head blocks used to support curtains, hoists, etc. The overhead supports 108, 109 may also be or include structural building components, such as roof beams. The overhead supports 108, 109 should be robust enough to support the weight of the suspended components of the lift system 100 and the weight of the load 111. The overhead supports 108, 109 may include various pulleys, rails, hooks, ropes, and other cables, which devices may be independent of the lift system 100 described herein, or which may be used to support components of the lift system 100.

The counterweight 110 may include a container 112, such as a polymeric box, to which the pulleys 106a, 106b, 106g may be secured. Polymeric boxes are typically used in the art of theatrical productions to store and transport equipment, props, costumes, etc., from one venue to another, and may be referred to as "road cases." A frame 114 may be attached to or within the container 112 to provide additional strength and anchor points to handle the stresses associated with use as a counterweight 110. For example, the frame 114 may include metal plates to which pulleys 106a and 106b, or pulley 106g may be attached to spread loads applied by the fly line 104 over a larger area of the container 112. The frame 114 may also include beams, rods, angle iron, etc., to provide further support. The frame 114 may include materials such as aluminum, steel, or other metals or alloys, as well as any other material having appropriate physical properties, such as plastics or composites. The frame 114 is shown as inside the container 112, but all or a portion of the frame 114 may be outside the container 112 in additional embodiments. The container may include holes through which pulleys 106a, 106b, 106g may be attached to the frame 114 (e.g., by bolts or other means). The pulleys 106a, 106b, 106g are illustrated on the outside of the container 112, but one or more of the pulleys 106a, 106b, 106g may be mounted within the container 112 so long as appropriate holes are provided to route the fly line 104. Mounting one or more of the pulleys 106a, 106b, 106g within the container 112 may limit the volume of the container 112 that can be used for storage and transport of materials, particularly if the pulleys 106a, 106b, 106g have relatively large diameters. However, interior mounting of the pulleys 106a, 106b, 106g may eliminate the need to connect the pulleys 106a, 106b, 106g to the container 112 or disconnect the pulleys 106a, 106b, 106g from the container 112.

Removable weights 116 may be placed within the container 112 to make the mass of the counterweight 110 comparable to the mass of the load 111 to be lifted. The number or size of the removable weights 116 may vary based on the mass of the load 111, and may be adjusted from time to time. In some embodiments, the removable weights 116 may be in the form of blocks or bags of relatively uniform mass (e.g., sand bags, concrete mix, concrete blocks, bricks, containers of water, etc.). The removable weights 116 may include a material that is readily available on location where the lift system 100 is installed, such that the removable weights 116 need not be transported with the other components of the lift system 100. The container 112 may have a removable cover or lid, such that the removable weights 116 may be added or removed as needed. By matching the mass of the counterweight 110 to the mass of the load 111, a relatively small force on the fly line 104 may raise and lower the load 111.

The base unit 118 may include pulleys and a brake, and may be temporarily or permanently secured to the floor. In some embodiments, the base unit 118 may be mechanically secured to the floor or to an object, such as by bolts. For example, the base unit 118 may be bolted to a board, pallet, or other object, which may in turn be weighted down by sand bags, concrete mix, concrete blocks, bricks, containers of water, etc.

Figure 2:
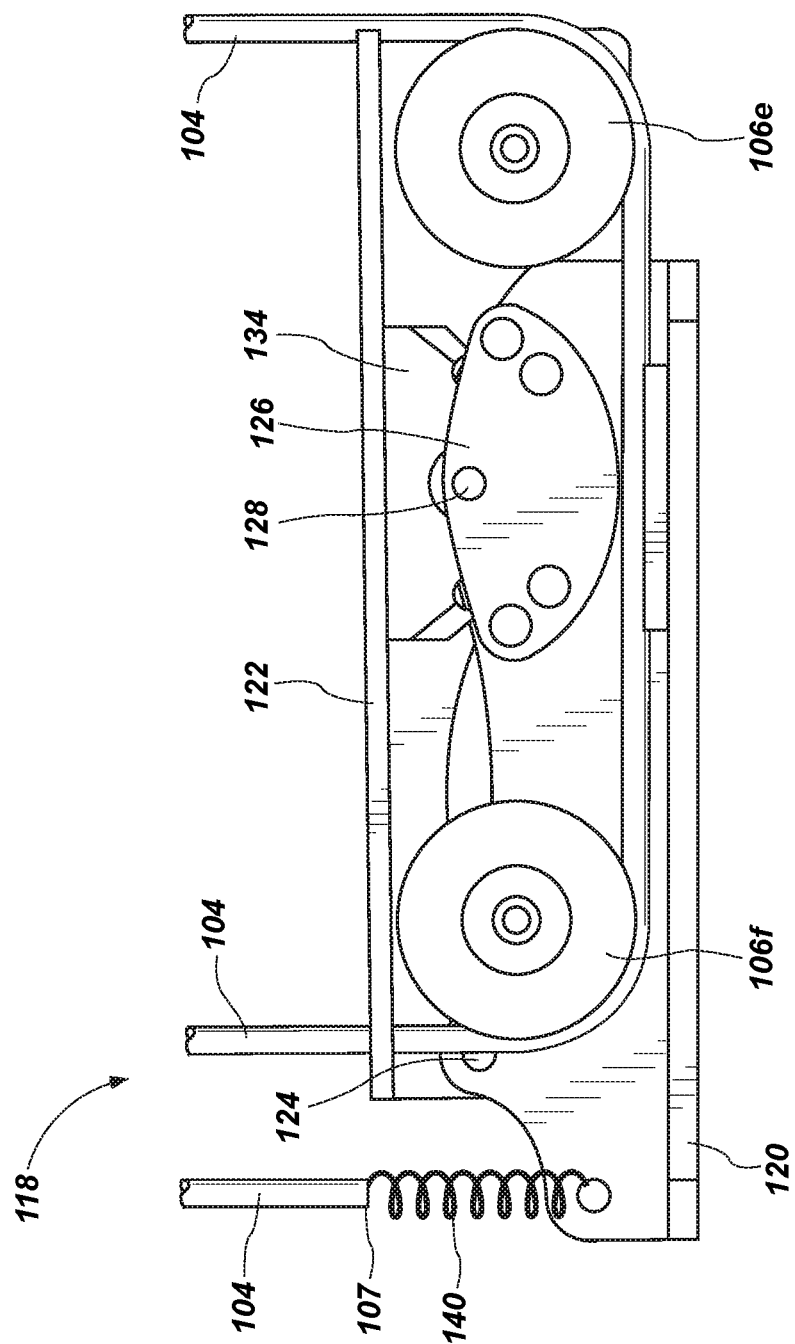
FIGS. 2 through 4 are simplified cross-sectional side views of a base unit including a line brake of the lift system shown in FIGS. 1A and 1B.
Figure 3:
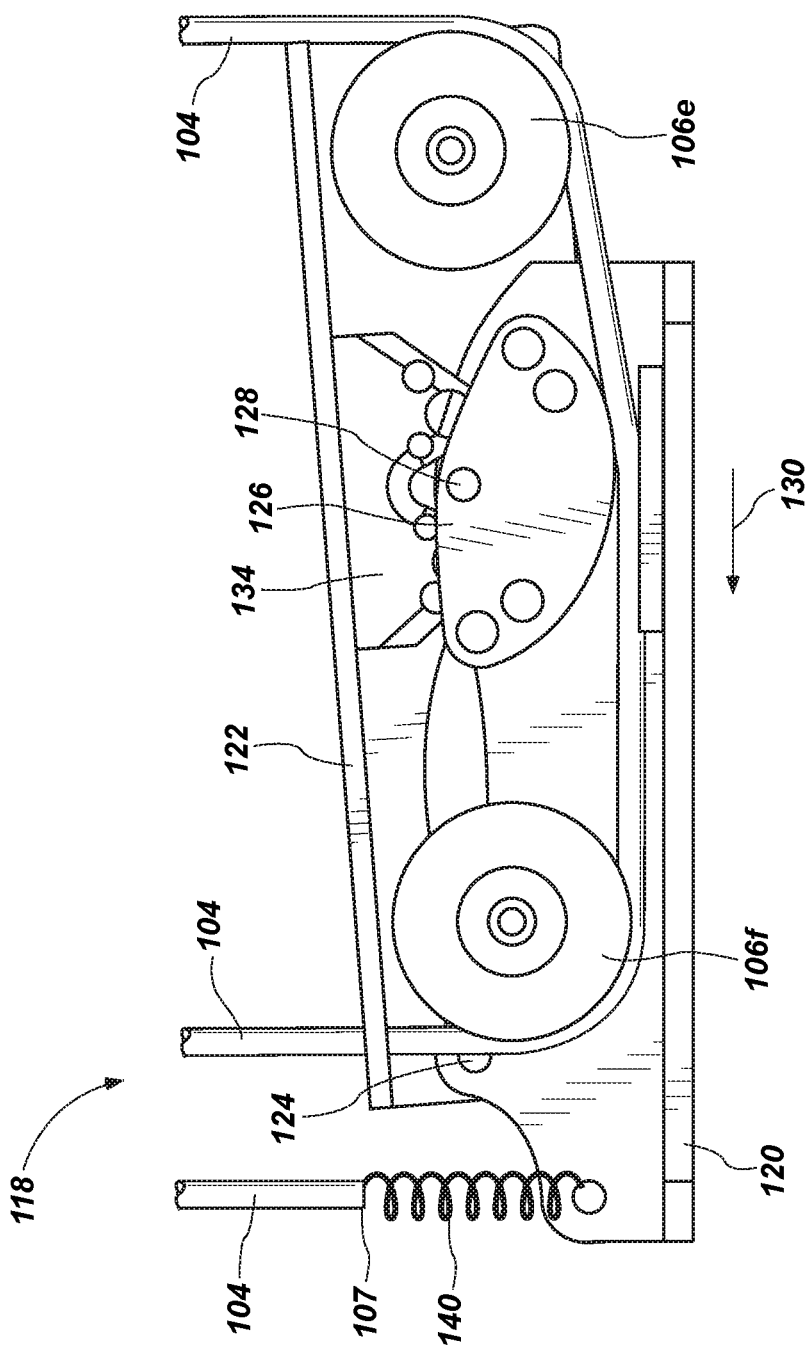
Figure 4:
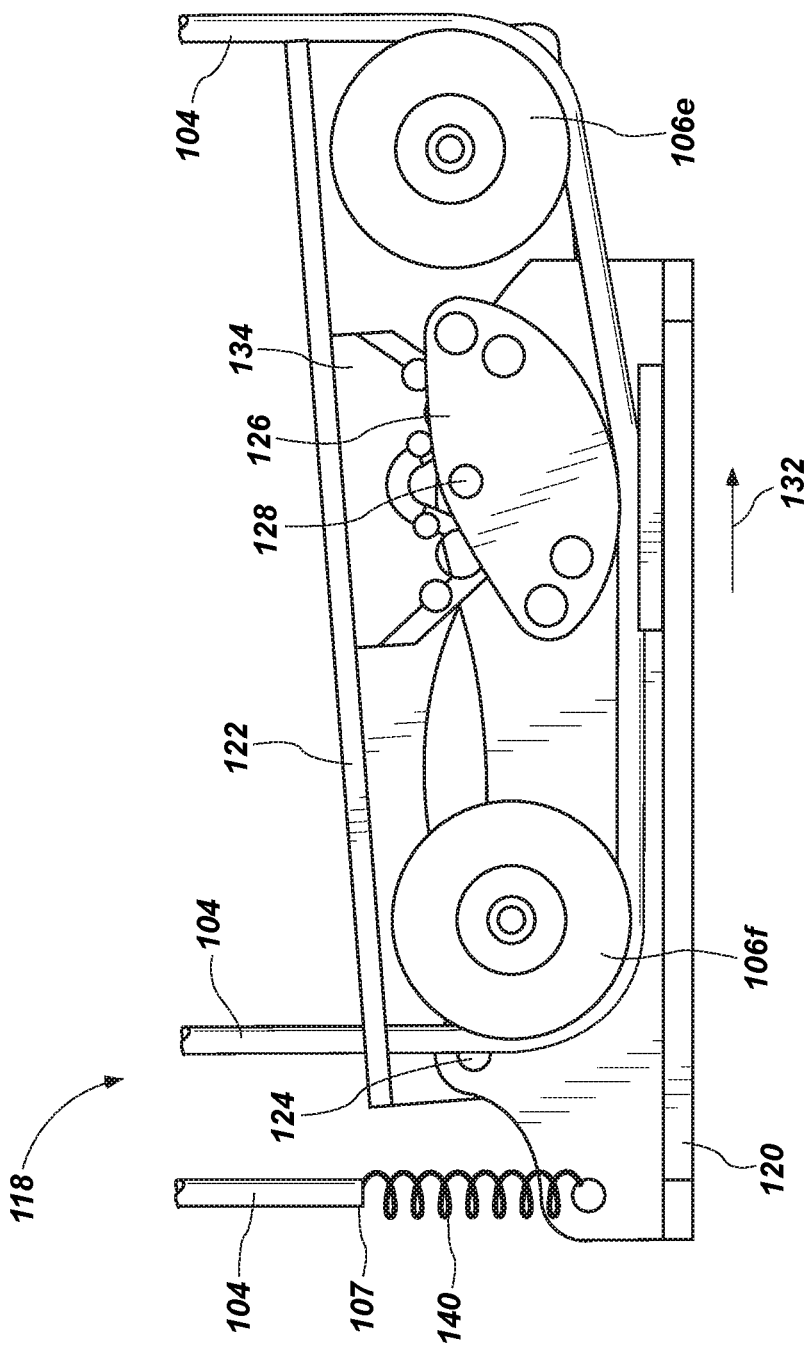

FIG. 2 illustrates the base unit 118 in greater detail. The base unit 118 may include a stationary member 120 and a movable member 122 connected by a hinge 124. The pulley 106e may be connected to the movable member 122, and the pulley 106f may be connected to the stationary member 120. The base unit 118 may include a brake, such as cam lock 126 connected to the stationary member 120 of the base unit 118 by a pin 128. The cam lock 126 may be configured to allow the fly line 104 to travel freely when the base unit 118 is in a first, unlocked position, as shown in FIG. 2, and to engage the fly line 104 when the base unit 118 is in a second, locking position, as shown in FIGS. 3 and 4.

For example, the cam lock 126 may have an elongated or partially elliptical shape (i.e., a shape corresponding in part to the shape of an ellipse), such that in the first position, the fly line 104 can pass adjacent the cam lock 126 without touching the cam lock 126. When the movable member 122 is in the second position, the fly line 104 touches the cam lock 126, which then may rotate about the pin 128 such that the fly line 104 becomes wedged between the cam lock 126 and the stationary member 120 until the fly line 104 stops moving. In other words, the fly line 104 may become wedged between the cam lock 126 and the stationary member 120 of the base unit 118, stopping the cam lock 126 and the fly line 104 from further movement. The direction of travel of the fly line 104 may determine which direction the cam lock 126 moves to lock the fly line 104. That is, if the fly line 104 travels in the direction of an arrow 130 shown in the FIG. 3, the cam lock 126 may be pushed to the left. If the fly line 104 travels in the direction of an arrow 132 shown in the FIG. 4, the cam lock 126 may be pushed to the right. In either case, forces applied to the fly line 104 by the cam lock 126 and the stationary member 120 of the base unit 118 may limit or prevent further movement of the fly line 104 until the cam lock 126 is returned to a neutral position. When the movable member 122 is up, as in FIGS. 3 and 4, the cam lock 126 may be free to shift to prevent the fly line 104 from moving other than to wedge the cam lock 126 against the stationary member 120 of the base unit 118. The base unit 118 may be configured such that the movable member 122 is up, allowing the cam lock 126 to lock the fly line 104, except when a downward force is acting on the movable member 122, such as a person stepping on the movable member 122 with his or her foot. Thus, the base unit 118 may serve as a safety lock preventing movement of the fly line 104 when an operator is not pressing on the movable member 122.

Figure 5:
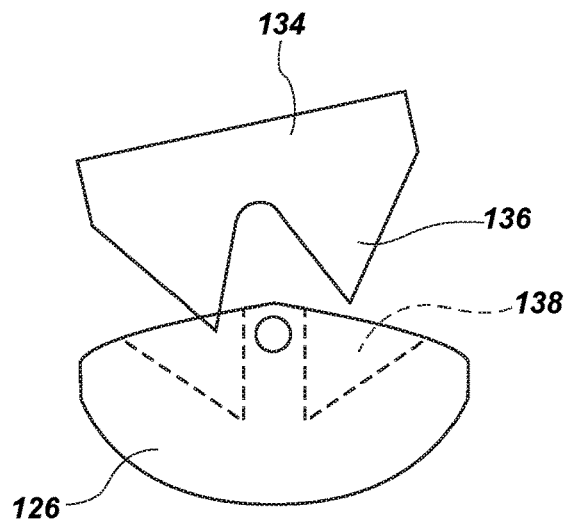
FIG. 5 is a simplified cross-sectional side view of a cam lock and return mechanism of the base unit shown in FIGS. 2 through 4.

In some embodiments, the movable member 122 of the base unit 118 may include a return mechanism 134 to urge the cam lock 126 into a neutral position when the movable member 122 is moved to the first, unlocked position. Thus, when the movable member 122 is down, as in FIG. 2, the fly line 104 may travel freely between the pulleys 106e and 106f without contacting the cam lock 126. For example, the return mechanism 134 may include a body having a shape corresponding to an interior surface of the cam lock 126. FIG. 5 is a simplified view showing only the cam lock 126 and the return mechanism 134. The return mechanism 134 may have two points 136 extending downward corresponding to two voids 138 (indicated by dashed lines in FIG. 5) within an upper surface of the cam lock 126. There may be a space between the points 136 of the return mechanism 134 such that the return mechanism 134 can press downward around the pin 128 connecting the cam lock 126 to the stationary member 120 of the base unit 118. The shape of the return mechanism 134 and the cam lock 126 may be configured such that the return mechanism 134 smoothly returns the cam lock 126 to a neutral position when the return mechanism 134 pushes against the cam lock 126. Portions of the return mechanism 134 and/or the cam lock 126 may have relatively smooth surfaces or be coated with a smooth or non-stick material (e.g., TEFLON®) to promote the movement of the cam lock 126 by the return mechanism 134.

Figure 13:
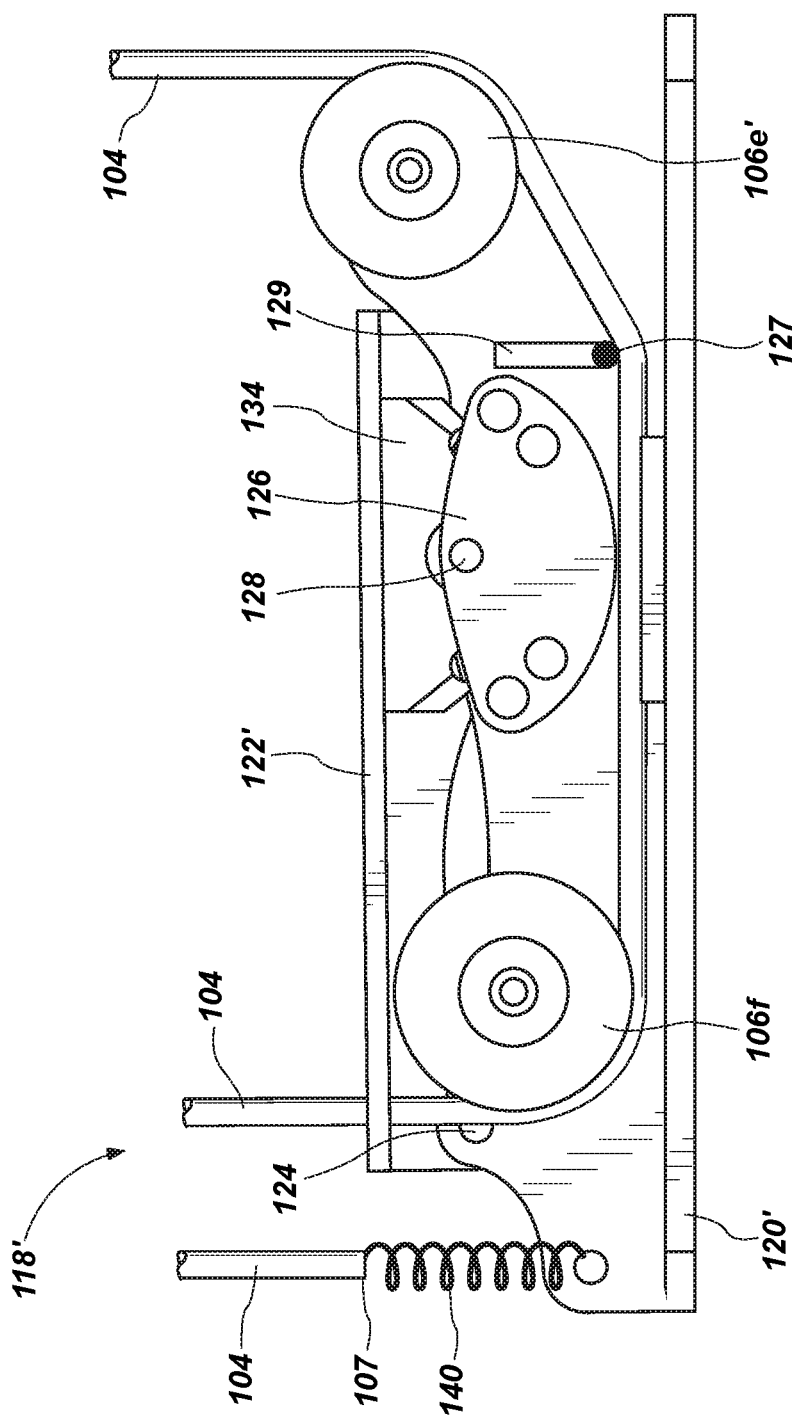
FIGS. 13 and 14 are simplified cross-sectional side views of another base unit including a line brake that may be used with the lift system shown in FIGS. 1A and 1B.
Figure 14:
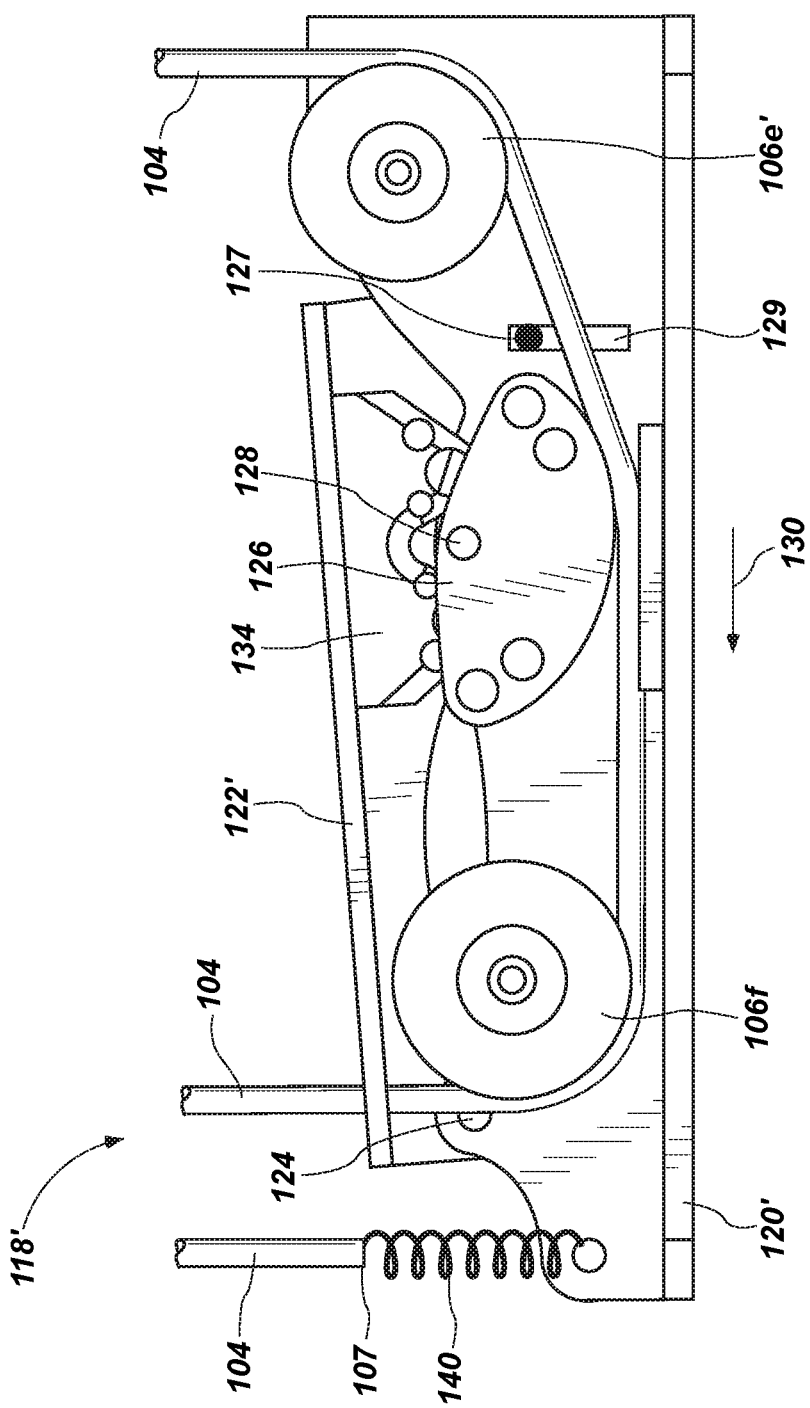

FIG. 13 illustrates another base unit 118'. The base unit 118' may include a stationary member 120' and a movable member 122' connected by a hinge 124. Pulleys 106e' and 106f' may be connected to the stationary member 120'. A roller 127 may be connected to the movable member 122' such that the roller 127 can slide vertically in a slot 129 in the stationary member 120'. The base unit 118' may include a brake, such as cam lock 126 as described above. When the movable member 122' is depressed, as shown in FIG. 13, the roller 127 may keep the fly line 104 out of contact with the cam lock 126. When the movable member 122' is raised, as shown in FIG. 14, the roller may also raise within the slot 129, allowing the fly line 104 to contact and engage the cam lock 126.

Referring again to FIG. 1A, in some embodiments, the lift system 100 may include a tensioner 140 to keep the fly line 104 taut. Because the movable member 122 of the base unit 118 may change the length of the path of the fly line 104, it may be desirable to take up slack in the fly line 104. The tensioner 140 may be, for example, a spring, a weight, etc. The tensioner 140 is shown in FIG. 1A secured to the end 107 of the fly line 104, connecting the fly line 104 to the base unit 118. In such embodiments, the tensioner 140 may pull the fly line 104 in substantially the same direction as the fly line 104 is oriented. In other embodiments, the tensioner 140 may be configured to pull or push the fly line 104 in a direction approximately perpendicular to the direction of the fly line 104.

The base unit 118 may be configured such that the movable member 122 is up (e.g., in the position shown in FIG. 3 or FIG. 4) unless an external force is pushing down on the movable member 122. For example, the weight of the container 112 and/or the load 111 (if the weight of the container 112 does not precisely match the weight of the load 111), the tension of the fly line 104 (e.g., as maintained by the tensioner 140), and/or the force of a biasing element on the movable member 122 (e.g., a spring within the base unit 118) may provide an upward force on the movable member 122. By defaulting to a position in which the fly line 104 may lock, the base unit 118 may provide a measure of safety against accidental release of the fly line 104.

Components of the lift system 100 shown in FIGS. 1A and 1B may be packed and transported to other locations, such as to other theaters or venues. For example, the container 112 may be configured to receive some or all of the pulleys 106, the line stopper 113, the safety line 117, the base unit 118, the return mechanism 134, the fly line 104, and/or the load line 102. Some pulleys 106 may typically be available on location, so some of the pulleys (e.g., the pulleys 106c, 106d, and 106h, each connected to the overhead support 108) may not be carried within the container 112. The removable weights 116 may be removed from the container 112 before transport to save space and weight of the container 112. Typically, removable weights 116 may be available at or near other locations where the lift system 100 is to be used, so expenses associated with transporting removable weights 116 may be avoided. Avoiding excess weight may be particularly desirable for air travel, and omission of the removable weights 116 may keep the container 112 weight within limits that make air travel economically feasible. Thus a production requiring lift capabilities may be performed at venues where built-in systems are not available.

The lift system 100 may be installed at a facility by removing components from the container 112, securing the fly line 104 to the overhead support 108, and routing the fly line 104 adjacent the pulleys 106 as described above. An end 107 of the fly line 104 may also be secured to the base unit 118. Some of the pulleys 106 may be secured to the container 112, and weights may be added to the container 112 to match the weight of the load 111 expected to be lifted by the lift system 100. The base unit 118 may be secured to a floor below the overhead support 108 by weighting the base unit 118 down, securing the base unit 118 to a weighted object, or mechanically securing (e.g., bolting) the base unit 118 to the floor, or to another structure weighted to the floor. The load line 102, line stopper 113, and safety line 117 may be installed as shown in FIG. 1B.

Once the lift system 100 is installed, an operator may lift a load 111 by applying a force to the base unit 118 to disengage the cam lock 126, and pulling the fly line 104 to move the counterweight 110 vertically upward or downward. This moves the load 111, typically in the opposite direction as the direction the counterweight 110 moves.

To make the lift system 100 relatively easier to operate without winches, motors, or other equipment requiring external energy, the mass of the counterweight 110 may be selected to be within approximately 10% of the mass of the load 111 to be lifted in some embodiments, such as within about 5% or even within about 1% of the mass of the load 111 to be lifted. That is, the mass of the counterweight may be between about 90% and 110% of the mass of the load 111, between about 95% and about 105% of the mass of the load 111, or even between about 99% and 101% of the mass of the load 111. A counterweight 110 more closely matched to the load 111 tends to make moving the load 111 with the lift system 100 relatively easier and faster.

The pulleys 106 may be selected to be relatively large to decrease frictional losses in the lift system 100. For example, larger pulleys cause the load line 102 and/or the fly line 104 to form more gradual bends over the sheaves of the pulleys 106, which gradual bends typically correspond with relatively lower friction. Smaller pulleys 106 may also be selected, such as to keep the components small enough to fit within a particular container 112. In some embodiments, the pulleys 106 may have a sheave diameter from about 1 inch (2.54 cm) to about 8 inches (20.3 cm). For example, the pulleys 106 may have a sheave diameter from about 2 inches (5.08 cm) to about 6 inches (15.2 cm). In some embodiments, the pulleys may have a sheave diameter of about 4 inches (10.2 cm). Some of the pulleys 106 may have different sheave diameters from other pulleys.

The lift system 100 may be used to lift a human, such as an actor on stage, or any other object. The lift system 100 may be configured to be operated without utilities such as electrical power or compressed air, and the operator may be able to safely raise and lower much more weight than he could lift with conventional systems, and may be able to raise and lower loads 111 faster than with conventional systems. The cam lock 126, which may be configured to lock to fly line 104 except when the operator presses down on the base unit 118 (e.g., by stepping on the base unit 118), as well as the line stopper 113, may help prevent accidental slippage of the fly line 104 and dropping the load 111.

Though described in conjunction with a stage and theatrical productions, the lift system 100 and methods described herein may be used in any situation requiring the ability to safely lift a load 111. For example, the lift system 100 may be used for building maintenance, construction, search-and-rescue operations, recreation, etc. The lift system 100 may be particularly useful in locations where lifting is needed on occasion, but not often enough to justify a permanently installed lift system. The lift system may also be beneficial where utilities to operate motors or winches are not readily available.

Additional non limiting example embodiments of the disclosure are described below.

Embodiment 1

A lift system comprising an overhead support comprising at least a first pulley and a second pulley, a counterweight comprising at least an upper pulley and a lower pulley, a base unit secured to a floor, a fly line connected to the overhead support and the base unit, and a load line. The base unit comprises a brake and at least one pulley. The fly line passes around the upper pulley of the counterweight, around the at least a first pulley of the overhead support, around the at least one pulley of the base unit, and around the lower pulley of the counterweight. The load line is connected to the counterweight passing around the second pulley of the overhead support and connected to a load, such that a change in elevation of the counterweight corresponds to a change in position of the load. The brake is configured to engage the fly line to limit movement of the counterweight.

Embodiment 2

The lift system of Embodiment 1, wherein the counterweight comprises a container configured to carry the base unit, at least one pulley, the fly line, and the load line.

Embodiment 3

The lift system of Embodiment 2, wherein the container comprises a hard polymeric box and wherein the counterweight further comprises a weight removable from the hard polymeric box.

Embodiment 4

The lift system of Embodiment 2 or Embodiment 3, wherein the container comprises a metal frame.

Embodiment 5

The lift system of any of Embodiments 1 through 4, wherein the brake comprises a cam lock configured to contact the fly line when the brake is engaged.

Embodiment 6

The lift system of any of Embodiments 1 through 5, wherein the brake is configured to disengage when a force is applied to the brake.

Embodiment 7

The lift system of any of Embodiments 1 through 6, wherein the brake is operable to engage and disengage the fly line by a human operator without additional energy input.

Embodiment 8

The lift system of any of Embodiments 1 through 7, wherein the lift system is operable to change an elevation of the load by a human operator without additional energy input.

Embodiment 9

The lift system of any of Embodiments 1 through 8, wherein the counterweight has a mass approximately equal to a mass of the load.

Embodiment 10

The lift system of any of Embodiments 1 through 9, further comprising a tensioner configured to maintain the fly line in a taut condition.

Embodiment 11

The lift system of any of Embodiments 1 through 10, wherein the base unit is temporarily secured to the floor.

Embodiment 12

The lift system of Embodiment 11, wherein the base unit is temporarily secured to the floor by a weight.

Embodiment 13

The lift system of any of Embodiments 1 through 12, wherein the base unit is mechanically secured to the floor.

Embodiment 14

The lift system of any of Embodiments 1 through 13, wherein the base unit comprises a stationary member and a movable member, the movable member connected to the stationary member by a hinge.

Embodiment 15

The lift system of Embodiment 14, wherein the brake comprises a movable cam connected to the stationary member of the base unit.

Embodiment 16

A manual line brake comprising a housing comprising a stationary member, a movable member, and a hinge rotatably connecting the movable member to the stationary member. A first pulley is rotatably secured to the stationary member of the housing. A second pulley is rotatably secured to the movable member of the housing. A cam lock is within the housing between the first pulley and the second pulley. The cam lock is configured to engage a rope passing from the first pulley to the second pulley when the movable member of the housing is in a first position, and the cam lock is configured to disengage from the rope when the movable member of the housing is in a second position.

Embodiment 17

The manual line brake of Embodiment 16, wherein engagement of the rope by the cam lock is configured to limit movement of the rope along a path between the first pulley and the second pulley.

Embodiment 18

The manual line brake of Embodiment 16 or Embodiment 17, wherein the movable member of the housing is configured to be in the first position when a tension of the rope is greater than a downward force applied to the movable member of the housing.

Embodiment 19

The manual line brake of any of Embodiments 16 through 18, wherein movement of the rope when the movable member of the housing is in the first position moves the cam to a locking position.

Embodiment 20

The manual line brake of any of Embodiments 16 through 19, wherein movement of the movable member of the housing from the first position to the second position moves the cam lock to a non-locking position.

Embodiment 21

The manual line brake of any of Embodiments 16 through 19, further comprising a return mechanism comprising a body having a shape corresponding at least partially to a shape of a void defined by the cam lock.

Embodiment 22

A method of vertically moving a load comprising routing a fly line adjacent at least one pulley secured to a counterweight, adjacent at least one pulley secured to an overhead support, through a base unit comprising at least one pulley and a manual brake, and adjacent at least another pulley secured to the counterweight. The method also includes routing a load line adjacent at least one pulley, securing the base unit to a floor below the overhead support, applying a force to the base unit to disengage the manual brake, and pulling the fly line to move the counterweight vertically in a first direction and move a load vertically in a second direction substantially opposite the first direction. Ends of the fly line are secured to the overhead support and to the base unit, and ends of the load line are secured to the counterweight and to the load.

Embodiment 23

The method of Embodiment 22, further comprising selecting the counterweight to have a mass approximately equal to a mass of the load.

Embodiment 24

The method of Embodiment 23, wherein selecting the counterweight to have a mass approximately equal to a mass of the load comprises selecting the counterweight to have a mass in a range from about 90% of the mass of the load to about 110% of the mass of the load.

Embodiment 25

The method of any of Embodiments 22 through 24, wherein securing the base unit to a floor below the overhead support comprises securing the base unit to a movable object having a mass greater than a mass of the load.

Embodiment 26

The method of any of Embodiments 22 through 25, further comprising removing the force from the base unit to engage the manual brake and lock the fly line to limit movement of the counterweight and the load.

Embodiment 27

The method of any of Embodiments 22 through 26, wherein pulling the fly line to move the counterweight vertically in a first direction and move the load vertically in a second direction comprises raising a human above a horizontal surface.

Embodiment 28

The method of any of Embodiments 22 through 27, wherein pulling the fly line to move the counterweight vertically in a first direction and move the load vertically in a second direction comprises pulling the fly line by a human operator without external energy input.

Embodiment 29

A portable lift system comprising a plurality of pulleys, a base unit configured to be secured to a floor, a fly line, a load line, and a container configured to carry the plurality of pulleys, the base unit, the fly line, and the load line when the lift system is in transport. The base unit comprises at least one pulley and a brake. The container comprises a frame defining a plurality of mounting holes configured to be secured to at least two pulleys of the plurality when the portable lift system is in use. The container is configured to vertically carry a counterweight when the portable lift system is in use. The brake is configured to engage the fly line to limit vertical movement of the container.

Embodiment 30

The portable lift system of Embodiment 29, further comprising a tensioner configured to keep the fly line taut when the portable lift system is in use.

Embodiment 31

A method of operating a lift system, comprising disengaging a manual brake, pulling a first fly line to move a counterweight vertically in a first direction and move a first load vertically in a second direction, and engaging the manual brake to limit movement of the first fly line. The manual brake is configured to limit movement of a first fly line when the manual brake is engaged when the manual brake and the first fly line are located at a first location. The second direction is substantially opposite the first direction, and the counterweight comprises a container. The method may further include disposing the manual brake within the container, transporting the container with the manual brake therein to a second location, configuring the manual brake to limit movement of a second fly line at the second location when the manual brake is engaged, disengaging the manual brake, pulling the second fly line to move the counterweight vertically in a third direction and move a second load vertically in a fourth direction, and engaging the manual brake to limit movement of the second fly line. The fourth direction is substantially opposite the third direction.

Embodiment 32

The method of Embodiment 31, wherein the second fly line comprises the first fly line, and further comprising disposing the first fly line within the container before transporting the container to the second location.

Embodiment 33

A line stopper comprising a rigid member defining a tapered cavity therethrough and a line passing through the tapered cavity. The tapered cavity has a first cross-sectional area at one end thereof and a second cross-sectional area at an opposite end thereof. The first cross-sectional area is larger than the second cross-sectional area. The line comprises a tapered plug disposed within the line. The tapered plug has a shape corresponding approximately to the shape of the tapered cavity in the rigid member. The line surrounding the tapered plug has a cross-sectional area larger than the second cross-sectional area of the rigid member.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various lift types and configurations.

What is claimed is:

1. A manual line brake, comprising:
   a housing comprising a stationary member, a movable member, and a hinge rotatably connecting the movable member to the stationary member;
   a first pulley rotatably secured to the stationary member of the housing;
   a second pulley rotatably secured to the movable member of the housing; and
   a cam lock within the housing located in a space between the first pulley and the second pulley; and
   wherein the cam lock is configured to engage a line passing from the first pulley to the second pulley when the movable member of the housing is in a first position, and wherein the cam lock is configured to disengage from the line when the movable member of the housing is in a second position.

2. The manual line brake of claim 1, wherein engagement of the line by the cam lock is configured to limit movement of the line along a path between the first pulley and the second pulley.

3. The manual line brake of claim 1, wherein the movable member of the housing is configured to be in the first position when a tension of the line is greater than a downward force applied to the movable member of the housing.

4. The manual line brake of claim 1, wherein movement of the line when the movable member of the housing is in the first position moves the cam lock to a locking position.

5. The manual line brake of claim 1, wherein movement of the movable member of the housing from the first position to the second position moves the cam lock to a non-locking position.

6. The manual line brake of claim 1, further comprising a return mechanism comprising a body having a shape corresponding at least partially to a shape of a void defined by the cam lock.

* * * * *